(12) United States Patent
Yuan et al.

(10) Patent No.: US 10,756,537 B2
(45) Date of Patent: Aug. 25, 2020

(54) SHORT CIRCUIT FAULT CURRENT LIMITER

(71) Applicants: HUAZHONG UNIVERSITY OF SCIENCE AND TECHNOLOGY, Wuhan (CN); GUANGZHOU POWER SUPPLY CO. LTD., Guangzhou (CN)

(72) Inventors: Zhao Yuan, Wuhan (CN); Junxiang Liu, Guangzhou (CN); Fating Yuan, Wuhan (CN); Lixue Chen, Wuhan (CN); Junjia He, Wuhan (CN); Yuan Pan, Wuhan (CN); Kaijian Wu, Wuhan (CN); Yong Wang, Guangzhou (CN); Wenxiong Mo, Guangzhou (CN); Haibo Su, Guangzhou (CN)

(73) Assignees: HUAZHONG UNIVERSITY OF SCIENCE AND TECHNOLOGY, Wuhan (CN); GUANGZHOU POWER SUPPLY CO., LTD., Guangzhou (CN)

(*) Notice: Subject to any disclaimer, the term of this patent is extended or adjusted under 35 U.S.C. 154(b) by 413 days.

(21) Appl. No.: 15/580,520

(22) PCT Filed: Nov. 28, 2016

(86) PCT No.: PCT/CN2016/107489
§ 371 (c)(1),
(2) Date: Dec. 7, 2017

(87) PCT Pub. No.: WO2018/076431
PCT Pub. Date: May 3, 2018

(65) Prior Publication Data
US 2020/0052483 A1    Feb. 13, 2020

(30) Foreign Application Priority Data

Oct. 27, 2016  (CN) .......................... 2016 1 0957240

(51) Int. Cl.
*H02H 9/02* (2006.01)
*H02H 3/02* (2006.01)

(52) U.S. Cl.
CPC ............ *H02H 9/021* (2013.01); *H02H 3/021* (2013.01)

(58) Field of Classification Search
CPC ............ H02H 9/021; H02H 3/021; H02H 3/08
(Continued)

(56) References Cited

U.S. PATENT DOCUMENTS

| 3,868,552 A | 2/1975 | Wickson |
| 2018/0005783 A1* | 1/2018 | Yuan ...................... H02H 3/087 |

FOREIGN PATENT DOCUMENTS

| CN | 103825261 A | 5/2014 |
| CN | 203632229 U | 6/2014 |

(Continued)

OTHER PUBLICATIONS

CN-105305371; Specification and Drawings; (Year: 2016).*
(Continued)

*Primary Examiner* — Dharti H Patel
(74) *Attorney, Agent, or Firm* — Maier & Maier, PLLC

(57) ABSTRACT

A short circuit fault current limiter includes a circuit breaker, a transfer current limiting unit and a current detection unit. The current detection unit is connected to the circuit breaker in series, and the circuit breaker and the transfer current limiting unit are connected in parallel into the power system line. An output terminal of the current detection unit is connected to a control terminal of the transfer current limiting unit. The current detection unit is configured to detect a fault current flowing through a branch of the circuit breaker under a short circuit fault operating condition and trigger the corresponding trigger switch of the transfer current limiting unit to be switched on, so that the circuit (Continued)

breaker is disconnected and the secondary side winding of the coupling reactor is connected to the system line in series, which is capable of rapidly limiting the amplitude of the fault current and reducing impact of the fault current on the system.

7 Claims, 2 Drawing Sheets

(58) Field of Classification Search
USPC .......................................................... 361/115
See application file for complete search history.

(56) References Cited

FOREIGN PATENT DOCUMENTS

| CN | 105305371 A | 2/2016 |
|---|---|---|
| CN | 105356434 A | 2/2016 |
| CN | 105470911 A | 4/2016 |
| CN | 206180580 U | 5/2017 |

OTHER PUBLICATIONS

International Search Report dated Jul. 18, 2017 of corresponding International application No. PCT/CN2016/107489; 4pgs.
Extended European Search Report dated Sep. 24, 2018, including the Supplementary European Search Report and the European Search Opinion, in connection with corresponding EP Application No. 16901907.2 (6 pgs.).

* cited by examiner

SHORT CIRCUIT FAULT CURRENT LIMITER

FIELD OF THE INVENTION

The invention relates to a field of current limiter, and more particularly to a short circuit fault current limiter based on a coupling reactor.

BACKGROUND OF THE INVENTION

In recent years, with rapid development of the electric power system, short circuit current level of the system increases dramatically, and the increased short circuit current level results in serious consequences to the power grid, which restricts development of the electric power system. Therefore, effective measures must be taken to limit the short circuit fault current.

As a solution for limiting the short circuit fault current, the fault current limiter can effectively limit the short circuit current lever in the power grid. The fault current limiter has the following advantages: on the one hand, dynamic and thermal stability load of various high-voltage electrical equipment such as a circuit breaker can be reduced to ensure safety and stable operation of the power grid; and on the other hand, design capacity of the power grid structure can be remarkably reduced. Thus, it is of great practical significance and application value to develop a novel fault current limiter which is excellent in performance and economically reasonable.

Currently, there are several types of fault current limiters as below: (1) a fault current limiter in which a current limiting reactor is connected into the system in series, but the series-in inductance may increase normal running impedance of the system, thereby affecting transmission capacity and operation stability of the system; (2) an inductive superconducting fault current limiter, but hidden danger that the transformer bears a too large short-circuit current and is saturated in magnetic flux is required to be avoided in the current limiting process; (3) a solid-state fault current limiter which is divided into a switch type solid-state fault current limiter and a resonance type solid-state fault current limiter, but the switch type solid-state fault current limiter has a relatively high cost while requiring a extremely high response speed of the protection circuit, and the resonance type solid-state fault current limiter introduces inductor and capacitance elements, which increases possibility of generation of oscillation and overvoltage in the system; and (4) an arc current transfer type fault current limiter, but it limits the fault current by a current limiting resistance, and thus has a resistance heating problem under the current-limiting operating condition. Thus, application of the above current limiting schemes in an actual system is limited due to various defects.

SUMMARY OF THE INVENTION

In view of the above-described problems, the invention provides a short circuit fault current limiter which aims at reducing duration of a large fault current, reducing influence of the fault current on the system, increasing the breaking reliability and reducing cost of the device.

The invention provides a short circuit fault current limiter comprising: a circuit breaker CB1, a transfer current limiting unit and a current detection unit, in which the current detection unit is connected to the circuit breaker CB1 in series; the circuit breaker CB1 and the transfer current limiting unit are connected in parallel into the power system line; an output terminal of the current detection unit is connected to a control terminal of the transfer current limiting unit; and the current detection unit is configured to detect a fault current flowing through a branch of the circuit breaker CB1 under a short circuit fault operating condition and trigger the trigger switch of the transfer current limiting unit to be switched on.

Further, the transfer current limiting unit may adopt a first scheme or a second scheme. The transfer current limiting unit adopting the first scheme comprises: a first precharge capacitor C1, a second precharge capacitor C2, a first trigger switch K1, a second trigger switch K2 and a coupling reactor, in which a primary side winding of the coupling reactor includes a first tap and a second tap, and a secondary side winding of the coupling reactor is connected to the circuit breaker CB1 in parallel. The first tap is connected in series to the first trigger switch K1 and the first precharge capacitor C1 in sequence, and the second tap is connected in series to the second precharge capacitor C2 and the second trigger switch K2 in sequence.

Further, when a short circuit fault occurs, according to the direction of the fault current detected by the current detection unit, the first trigger switch K1 or the second trigger switch K2 in the first scheme is triggered to be switched on, so that the secondary side winding of the coupling reactor generates a high-frequency oscillation current with an amplitude higher than that of the system fault current.

Further, according to the short circuit fault current in the system, the capacitance parameters and the coupling reactor parameters in the first scheme are reasonably matched, and these parameters mainly includes: the capacitance value and the charging voltage of the first precharge capacitor C1 and the second precharge capacitor C2, and the transformation ratio and coupling coefficient of the first tap and the second tap to the secondary side winding.

The transfer current limiting unit adopting the second scheme comprises: a third precharge capacitor C3, a third trigger switch K3 and a coupling reactor, in which a primary side winding of the coupling reactor is connected in series to the third trigger switch K3 and the third precharge capacitor C3 in sequence, and a secondary side winding of the coupling reactor is connected to the circuit breaker CB1 in parallel.

Further, when a short circuit fault occurs, the third trigger switch K3 is triggered by a control signal output from the current detection unit to be switched on, so that the secondary side winding of the coupling reactor generates a high-frequency oscillation current with an amplitude higher than that of the system fault current.

Further, according to the short circuit fault current in the system, the capacitance parameters and the coupling reactor parameters in the second scheme are reasonably matched, and these parameters mainly includes: the capacitance value and the charging voltage of the third precharge capacitor C3, and the transformation ratio and coupling coefficient of the coupling reactor, so that high-frequency oscillation current generated by the secondary side winding of the coupling reactor and the short circuit fault current flowing through the circuit breaker CB1 are allowed to generate a zero crossing point.

The invention has the following advantages:

(1) under a normal operating condition, the system current flows through the branch of the circuit breaker CB1, the running loss is small, and thus the current limiter substantially has no effect on the system.

(2) under a short circuit fault operating condition, if the transfer current limiting unit adopts the first scheme, according to the direction of the fault current detected by the current detection unit, the first trigger switch K1 or the second trigger switch K2 is triggered to be switched on to so as to disconnect the circuit breaker CB1, such that the secondary side winding of the coupling reactor is connected in series to the system line, and thus the amplitude of the fault current can be rapidly limited and impact of the fault current on the system can be reduced.

(3) under a short circuit fault operating condition, if the transfer current limiting unit adopts the second scheme, the third trigger switch K3 is triggered to be switched on to so as to disconnect the circuit breaker CB1, such that the secondary side winding of the coupling reactor is connected in series to the system line, and thus the amplitude of the fault current can be rapidly limited and impact of the fault current on the system can be reduced.

DETAILED DESCRIPTION OF THE EMBODIMENTS

For clear understanding of the objectives, features and advantages of the invention, detailed description of the invention will be given below in conjunction with accompanying drawings and specific embodiments. It should be noted that the embodiments described herein are only meant to explain the invention, and not to limit the scope of the invention.

Figure 1:
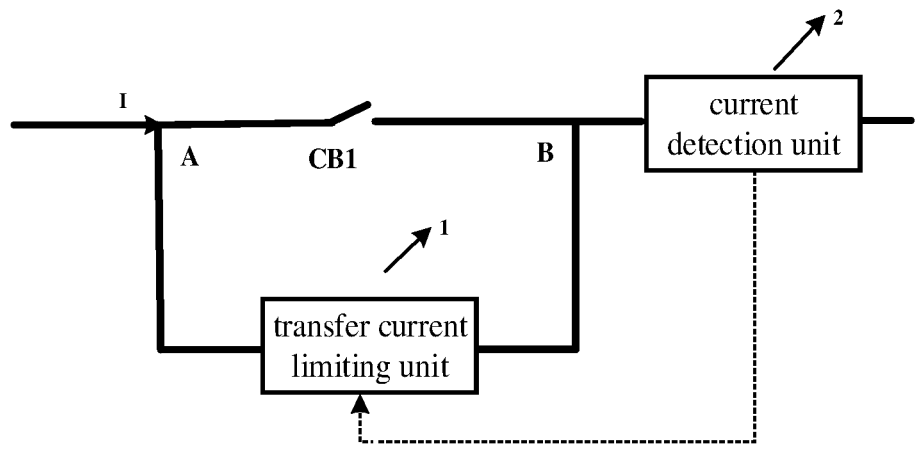
FIG. 1 is a schematic block diagram of a short circuit fault current limiter according to the invention, in which the reference number "1" designates a transfer current limiting unit and the reference number "2" designates a current detection unit.
Figure 2:
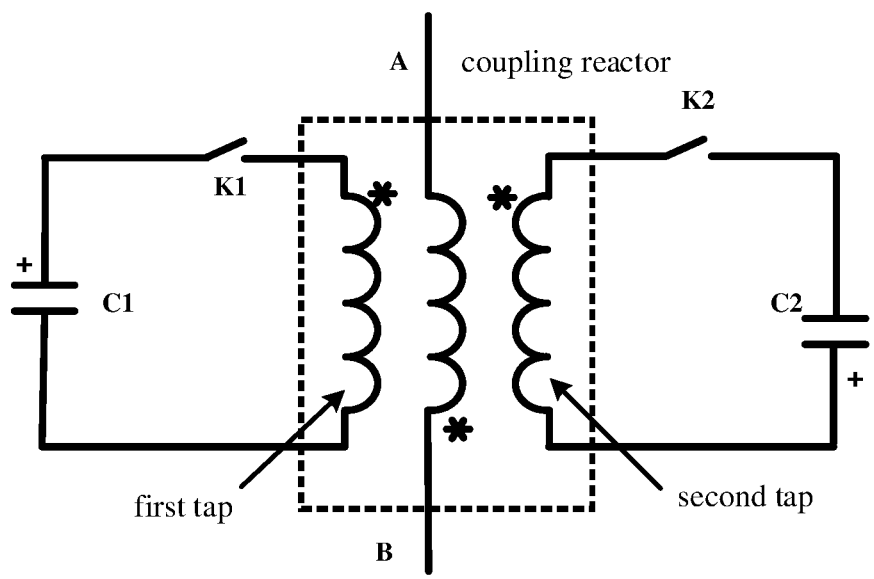
FIG. 2 is a schematic diagram of a transfer current limiting unit adopting a first scheme in the short circuit fault current limiter according to the invention, in which the reference sign "C1" designates a first precharge capacitor, the reference sign "C2" designates a second precharge capacitor, the reference sign "K1" designates a first trigger switch, and the reference sign "K2" designates a second trigger switch; the coupling reactor is composed of a primary side winding and a secondary side winding and the primary side winding is composed of a first tap and a second tap; and terminals A and B of the transfer current limiting unit in FIG. 2 are respectively connected to terminals A and B in FIG. 1.
Figure 3:
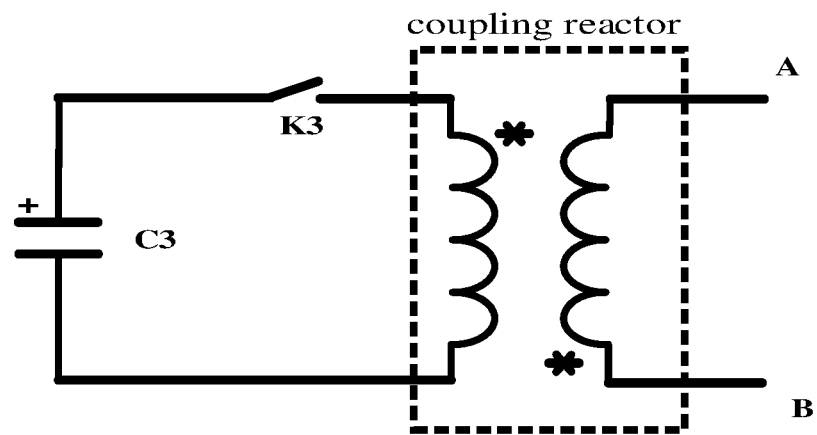
FIG. 3 is a schematic diagram of a transfer current limiting unit adopting a second scheme in the short circuit fault current limiter according to the invention, in which the reference sign "C3" designates a third precharge capacitor and the reference sign "K3" designates a third trigger switch; and terminals A and B of the transfer current limiting unit in FIG. 3 are respectively connected to terminals A and B in FIG. 1.

The invention particularly relates to a current transfer type fault current limiter capable of rapidly limiting the fault current based on a coupling reactor. FIG. 1 shows a schematic block diagram of a short circuit fault current limiter, FIG. 2 shows a specific circuit diagram of the transfer current limiting unit 1 adopting a first scheme in the short circuit fault current limiter, and FIG. 3 shows a specific circuit diagram of the transfer current limiting unit 1 adopting a second scheme in the short circuit fault current limiter. For convenience of description, only parts related to embodiments of the invention are shown in detail as below.

The invention provides a short circuit fault current limiter comprising: a circuit breaker CB1, a transfer current limiting unit 1 and a current detection unit 2. The current detection unit 2 is connected to the circuit breaker CB1 in series, and the circuit breaker CB1 and the transfer current limiting unit 1 are connected in parallel into the power system line. An output terminal of the current detection unit 2 is connected to a control terminal of the transfer current limiting unit 1 so as to trigger the corresponding switch to be switched on.

In the embodiments of the invention, the transfer current limiting unit 1 can adopt a first scheme or a second scheme.

The transfer current limiting unit 1 adopting the first scheme includes: a first precharge capacitor C1, a second precharge capacitor C2, a first trigger switch K1, a second trigger switch K2 and a coupling reactor, in which the coupling reactor includes a primary side winding and a secondary side winding, and the primary side winding is composed of a first tap and a second tap. The first tap is connected in series to the first precharge capacitor C1 and the first trigger switch K1 in sequence; the second tap is connected in series to the second precharge capacitor C2 and the second trigger switch K2 in sequence; and the secondary side winding of the coupling reactor is connected to the circuit breaker CB1 in parallel.

When the system operates normally, the first trigger switch K1 and the second trigger switch K2 are in an off state, the circuit breaker CB1 is in a closed state and the system current flows through the circuit breaker CB1.

When a short circuit fault occurs in the system, the short circuit current is rapidly increased, and when the short circuit current is larger than a set threshold value, contacts of the circuit breaker CB1 are opened and start arcing. After the contacts are opened to a certain opening range, according to a direction of the short circuit fault current flowing through the circuit breaker CB1 detected by the current detection unit 2, the corresponding first trigger switch K1 or second trigger switch K2 is triggered to be switched on, so that the transfer current limiting unit 1 generates a high-frequency reverse current with an amplitude higher than that of the fault current. This reverse current is superimposed on the circuit breaker CB1 to form "artificial current zero" so as to extinguish the electric arc. Thus, the short circuit fault current is transferred from a branch of the circuit breaker CB1 to a branch of the secondary side winding of the coupling reactor, so that fault current limiting is achieved.

When the direction of the short circuit fault current is detected to be positive, i.e., the same as the direction of the current I in FIG. 1, the circuit breaker CB1 starts to open and generates an electric arc. After the contacts of the circuit breaker CB1 are opened to a certain opening range, the first trigger switch K1 is switched on, the first precharge capacitor C1 is discharged through the first tap of the primary side winding of the coupling reactor to form a high-frequency oscillation current on the secondary side winding of the coupling reactor. This high-frequency oscillation current is superimposed on the fault current flowing through the circuit breaker CB1 to form current zero, at which the circuit breaker CB1 is subjected to arc extinguishing and disconnection.

When the direction of the short circuit fault current is detected to be negative, i.e., opposite to the direction of the current I in FIG. 1, the circuit breaker CB1 starts to open and generates an electric arc. After the contacts of the circuit breaker CB1 are opened to a certain opening range, the second trigger switch K2 is switched on, the second precharge capacitor C2 is discharged through the second tap of the primary side winding of the coupling reactor to form a high-frequency oscillation current on the secondary side winding of the coupling reactor. This high-frequency oscillation current is superimposed on the fault current flowing through the circuit breaker CB1 to form current zero, at which the circuit breaker CB1 is subjected to arc extinguishing and disconnection.

The transfer current limiting unit 1 adopting the second scheme includes: a third precharge capacitor C3, a third trigger switch K3 and a coupling reactor. The primary side winding of the coupling reactor is connected in series to the third trigger switch K3 and the third precharge capacitor C3 in sequence, and the secondary side winding of the coupling reactor is connected to the circuit breaker CB1 in parallel.

When the system operates normally, the third trigger switch K3 is disconnected, the circuit breaker CB1 is in a closed state and thus the system current flows through the circuit breaker CB1.

When a short circuit fault occurs in the system, the short circuit current is rapidly increased, and when the short circuit current is larger than a set threshold value, contacts of the circuit breaker CB1 are opened and perform arcing. After the contacts are opened to a certain opening range, the third trigger switch K3 is switched on.

When the direction of the short circuit fault current is detected to be positive, i.e., the same as the direction of the current I in FIG. 1, the transfer current limiting unit 1 generates a high-frequency oscillation current with an amplitude higher than that of the fault current. This reverse current is superimposed on the circuit breaker CB1 to form "artificial current zero" so as to extinguish the arc. Thus, the short circuit fault current is transferred from a branch of the circuit breaker CB1 to a branch of the secondary side winding of the coupling reactor, so that fault current limiting is achieved.

When the direction of the short circuit fault current is detected to be negative, i.e., opposite to the direction of the current I in FIG. 1, the transfer current limiting unit 1 generates a high-frequency oscillation current with an amplitude higher than that of the fault current. The second half-wave current of the oscillation current is superimposed on the circuit breaker CB1 to form "artificial current zero" so as to extinguish the arc. Thus, the short circuit fault current is transferred from a branch of the circuit breaker CB1 to a branch of the secondary side winding of the coupling reactor, so that fault current limiting is achieved.

In the embodiments of the invention, the coupling reactor may be a hollow coupling reactor or an iron core coupling reactor. The primary side winding of the coupling reactor in the transfer current limiting unit 1 adopting the first scheme is composed by the first tap and the second tap, and according to actual operating conditions of the system, the first tap and the second tap can be connected to the same terminal or different terminals of the primary side winding of the coupling reactor.

For clear understanding of the objectives, features and advantages of the invention, detailed description of the invention will be given below in conjunction with accompanying drawings. It should be noted that the embodiments described herein are only meant to explain the invention, and not to limit the scope of the invention.

The invention relates to a short circuit fault current limiter which is capable of rapidly limiting the amplitude of the fault current and reducing impact of the fault current on the system under a short circuit fault operating condition.

In order to further illustrate the short circuit fault current limiter in the embodiments of the invention, reference will now be made in detail to the drawings and specific examples as below.

FIG. 1 is a schematic diagram of a short circuit fault current limiter according to the invention, which is mainly composed by a circuit breaker CB1, a transfer current limiting unit 1 and a current detection unit 2.

In the circuit breaker CB1, under a normal operating condition, a rated current of the system is passed and running loss is small.

In the current detection unit 2, under a short circuit fault operating condition, the magnitude and direction of the fault current flowing through a brunch of the circuit breaker CB1 is detected and the signal is transmitted to the control terminal of the trigger switch in the transfer current limiting unit 1.

In the transfer current limiting unit 1 which may adopt a first scheme or a second scheme, under a short circuit fault operating condition, the signal transmitted by the current detection unit 2 is received to trigger the corresponding switch to be switched on, thereby generating a high-frequency oscillation current. This high-frequency oscillation current is superimposed on the fault current flowing through the circuit breaker CB1 to form current zero.

FIG. 2 is a schematic diagram of the transfer current limiting unit 1 adopting the first scheme in the short circuit fault current limiter.

The transfer current limiting unit 1 adopting the first scheme is composed by a first precharge capacitor C1, a second precharge capacitor C2, a first trigger switch K1, a second trigger switch K2 and a coupling reactor.

The first tap of the coupling reactor is connected to the first precharge capacitor C1 and the first trigger switch K1 in series, and the second tap of the coupling reactor is connected to the second precharge capacitor C2 and the second trigger switch K2 in series. When a short circuit fault occurs, according to the direction of the fault current, the first trigger switch K1 or the second trigger switch K2 is controlled to be switched on or off, so that the secondary side winding of the coupling reactor generates a high-frequency oscillation current with an amplitude higher than that of the system fault current.

According to the magnitude and direction of the short circuit fault current, the capacitance parameters and the coupling reactor parameters (mainly including the capacitance value and the charging voltage of the first precharge capacitor C1 and the second precharge capacitor C2, and the transformation ratio and coupling coefficient of the first tap and the second tap to the secondary side winding) in the transfer current limiting unit 1 are reasonably matched to enable the high-frequency oscillation current generated by the secondary side winding of the coupling reactor and the short circuit fault current flowing through the circuit breaker CB1 to generate a zero crossing point.

In a case where other parameters are not changed, the amplitude of the high-frequency oscillation current of the secondary side winding of the coupling reactor in the transfer current limiting unit 1 can be improved by increasing the coupling coefficients of the first tap and the second tap to the secondary side winding of the reactor and the capacitance value and the charging voltage of the first precharge capacitor C1 and the second precharge capacitor C2.

FIG. 3 is a schematic diagram of the transfer current limiting unit 1 adopting the second scheme in the short circuit fault current limiter.

The transfer current limiting unit 1 adopting the second scheme is composed by a third precharge capacitor C3, a third trigger switch K3 and a coupling reactor. The primary side winding of the coupling reactor is connected in series to the third trigger switch K3 and the third precharge capacitor C3 in sequence, and when a short circuit fault occurs, the third trigger switch K3 is triggered to be switched on, so that the secondary side winding of the coupling reactor generates a high-frequency oscillation current with an amplitude higher than that of the system fault current.

In a case where other parameters are not changed, the amplitude of the high-frequency oscillation current of the secondary side winding of the coupling reactor in the transfer current limiting unit 1 can be improved by increasing the coupling coefficient of the reactor and the capacitance value and the charging voltage of the third precharge capacitor C3.

In a case where the transfer current limiting unit 1 adopts the first scheme, the parameters of the coupling reactor and the charging capacitors should meet the following requirements:

when the current detection unit 2 detects that a short circuit fault occurs in the system, according the direction of the short circuit fault, the corresponding first trigger switch K1 or second trigger switch K2 is switched on, in which when the first trigger switch K1 is switched on, the first precharge capacitor C1 is discharged to the first tap of the primary side winding of the coupling reactor, and it is ensured that current zero is generated by the reverse high-frequency oscillation current and the fault current flowing through the circuit breaker CB1, and when the second trigger switch K2 is switched on, the second precharge capacitor C2 is discharged to the second tap of the primary side winding of the coupling reactor, and it is ensured that current zero is generated by the reverse high-frequency oscillation current and the fault current flowing through the circuit breaker CB1.

In a case where the transfer current limiting unit 1 adopts the second scheme, the parameters of the coupling reactor and the charging capacitor should meet the following requirements:

under a short circuit fault operating condition, when the third trigger switch K3 is switched on, the third precharge capacitor C3 is discharged to the primary side winding of the coupling reactor, and it is ensured that current zero is generated by the high-frequency oscillation current on the secondary side and the fault current flowing through the circuit breaker CB1.

The secondary side inductance parameter of the coupling reactor meets the following requirement: under a short circuit fault operating condition, after the circuit breaker CB1 is disconnected, the secondary side inductance of the coupling reactor is capable of limiting the fault current to the breaking capacity range of the circuit breaker.

Figure 4:
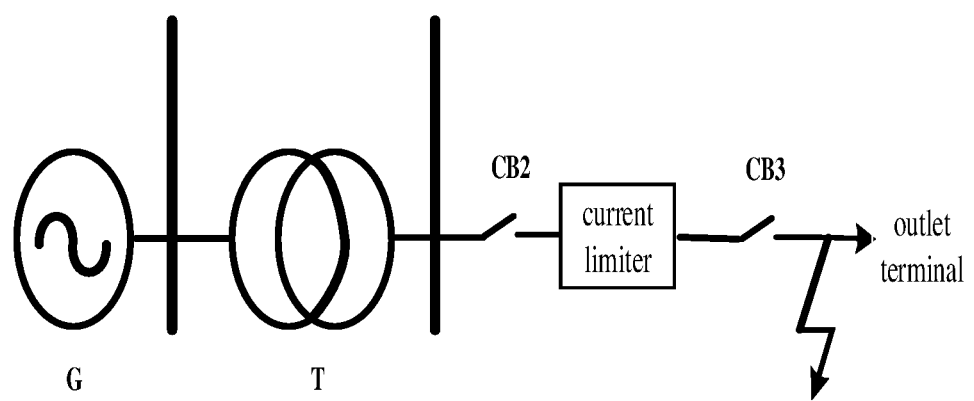
FIG. 4 is a schematic diagram of application of the short circuit fault current limiter according to the invention in the power system, in which the reference sign "G" designates an infinite system, the reference sign "T" designates a transformer, and the reference signs "CB2" and "CB3" each designate a circuit breaker.

FIG. 4 is a schematic diagram of application of the short circuit fault current limiter in the power system, in which the current limiter is installed on the low-voltage side of the transformer, and when a short circuit fault occurs at the outlet terminal, the short circuit fault current limiter rapidly acts to limit the fault current to the breaking capacity range of the circuit breaker and reduce the amplitude and the duration of the fault current, thereby reducing damage of the short circuit fault current to electric equipment such as a transformer and facilitating safe and stable operation of the electric power system.

While particular embodiments of the invention have been shown and described, it will be obvious to those skilled in the art that changes and modifications may be made without departing from the spirit and scope of the invention.

The invention claimed is:

1. A short circuit fault current limiter, comprising:
  a circuit breaker, a transfer current limiting unit and a current detection unit, wherein
  the current detection unit is connected to the circuit breaker in series, and the circuit breaker and the transfer current limiting unit are connected in parallel into a power system line;
  an output terminal of the current detection unit is connected to a control terminal of the transfer current limiting unit, and the current detection unit is configured to detect a fault current flowing through a branch of the circuit breaker under a short circuit fault operating condition and activate the transfer current limiting unit,
wherein the transfer current limiting unit comprises:
  a first precharge capacitor, a second precharge capacitor, a first trigger switch, a second trigger switch and a coupling reactor, in which:
  a primary side winding of the coupling reactor includes a first tap and a second tap, and a secondary side winding of the coupling reactor is connected to the circuit breaker in parallel; and
  the first tap is connected in series to the first trigger switch and the first precharge capacitor in sequence, and the second tap is connected in series to the second precharge capacitor and the second trigger switch in sequence.

2. The short circuit fault current limiter of claim 1, wherein when a short circuit fault occurs, the first trigger switch or the second trigger switch is triggered by a control signal output from the current detection unit to be switched on, so that the secondary side winding of the coupling reactor generates a high-frequency oscillation current with an amplitude higher than that of the system fault current.

3. The short circuit fault current limiter of claim 1, wherein the transfer current limiting unit comprises:
  a third precharge capacitor, a third trigger switch and a coupling reactor, wherein
  a primary side winding of the coupling reactor is connected in series to the third trigger switch and the third precharge capacitor in sequence, and a secondary side winding of the coupling reactor is connected to the circuit breaker in parallel.

4. The short circuit fault current limiter of claim 3, wherein when a short circuit fault occurs, the third trigger switch is triggered by a control signal output from the current detection unit to be switched on, so that the secondary side winding of the coupling reactor generates a high-frequency oscillation current with an amplitude higher than that of the system fault current.

5. The short circuit fault current limiter of claim 4, wherein according to the magnitude and direction of the short circuit fault current, the capacitance parameters and the coupling reactor parameters in the transfer current limiting unit are matched to enable the high-frequency oscillation current generated by the secondary side winding of the coupling reactor and the short circuit fault current flowing through the circuit breaker to generate a zero crossing point.

6. The short circuit fault current limiter of claim 5, wherein in a case where other parameters are not changed, the amplitude of the high-frequency oscillation current of the secondary side winding of the coupling reactor in the transfer current limiting unit is improved by increasing the capacitance value and the charging voltage of the first precharge capacitor and the second precharge capacitor and the coupling coefficient of the first tap and the second tap to the secondary side winding of the reactor.

7. The short circuit fault current limiter of claim 5, wherein in a case where other parameters are not changed, the amplitude of the high-frequency oscillation current of the secondary side winding of the coupling reactor in the transfer current limiting unit is improved by increasing the capacitance value and the charging voltage of the third precharge capacitor and the coupling coefficient of the reactor.

* * * * *